US009601828B2

(12) United States Patent
He et al.

(10) Patent No.: US 9,601,828 B2
(45) Date of Patent: Mar. 21, 2017

(54) SYSTEMS, APPARATUS, AND METHODS FOR ANTENNA SWITCHING APPROACH FOR INITIAL ACQUISITION PROCEDURE

(71) Applicant: QUALCOMM Incorporated, San Diego, CA (US)

(72) Inventors: Ning He, San Diego, CA (US); Daniel Fred Filipovic, Solana Beach, CA (US); Ramesh C. Chirala, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 263 days.

(21) Appl. No.: 13/834,777

(22) Filed: Mar. 15, 2013

(65) Prior Publication Data

US 2013/0308561 A1 Nov. 21, 2013

Related U.S. Application Data

(60) Provisional application No. 61/649,704, filed on May 21, 2012, provisional application No. 61/716,582, (Continued)

(51) Int. Cl.
*H01Q 3/24* (2006.01)
*H04W 24/02* (2009.01)
(Continued)

(52) U.S. Cl.
CPC ............... *H01Q 3/24* (2013.01); *H04B 1/44* (2013.01); *H04B 7/0404* (2013.01);
(Continued)

(58) Field of Classification Search
CPC ... H04W 76/027; H04W 24/02; H04W 88/06; H04W 36/30; H04W 36/14;
(Continued)

(56) References Cited

U.S. PATENT DOCUMENTS 5,481,571 A 1/1996 Balachandran et al.
5,530,926 A 6/1996 Rozanski
(Continued)

FOREIGN PATENT DOCUMENTS

CN 1764076 A 4/2006
CN 101562459 A 10/2009
(Continued)

OTHER PUBLICATIONS

Heath R W et al., "Multimode Antenna Selection for Spatial Multiplexing Systems With Linear Receivers", IEEE Transactions on Signal Processing, IEEE Service Center, New York, NY, US, vol. 53, No. 8, Aug. 1, 2005 (Aug. 1, 2005) , pp. 3042-3056, XP011136488, ISSN: 1053-587X, DOI: DOI:10.1109/TSP.2005. 851109.
(Continued)

*Primary Examiner* — Kan Yuen
*Assistant Examiner* — Richard Chang
(74) *Attorney, Agent, or Firm* — François A. Pelaez

(57) ABSTRACT

This disclosure provides systems, methods, and apparatus for an initial network acquisition process via multiple antennas. In one aspect a method of establishing communications via a wireless network at a wireless communications apparatus is provided. The method includes attempting an initial acquisition process, over one or more frequencies, for establishing communications over the wireless network via a transmit circuit and a receive circuit transmitting and receiving via a first antenna. The method further includes switching the transmit circuit and the receive circuit from transmitting and receiving via the first antenna to a second antenna in response to detecting failure of the initial acquisition process. The switching is independent of a performance metric of the first or the second antenna. The method further includes re-attempting the initial acquisition process (Continued)

based on the switching to the second antenna over the one or more frequencies.

30 Claims, 9 Drawing Sheets

Related U.S. Application Data filed on Oct. 21, 2012, provisional application No. 61/734,276, filed on Dec. 6, 2012, provisional application No. 61/737,715, filed on Dec. 14, 2012, provisional application No. 61/716,586, filed on Oct. 21, 2012, provisional application No. 61/716,599, filed on Oct. 21, 2012, provisional application No. 61/716,902, filed on Oct. 22, 2012, provisional application No. 61/736,541, filed on Dec. 12, 2012.

(51) Int. Cl.
| | | |
|---|---|---|
| *H04B 7/04* | (2006.01) | |
| *H04W 72/08* | (2009.01) | |
| *H04W 76/02* | (2009.01) | |
| *H04W 36/30* | (2009.01) | |
| *H04B 1/44* | (2006.01) | |
| *H04W 36/14* | (2009.01) | |
| *H04W 88/06* | (2009.01) | |
| *H04B 7/06* | (2006.01) | |
| *H04B 7/08* | (2006.01) | |

(52) U.S. Cl.
CPC ......... *H04B 7/0602* (2013.01); *H04B 7/0608* (2013.01); *H04B 7/0802* (2013.01); *H04B 7/0814* (2013.01); *H04W 24/02* (2013.01); *H04W 36/14* (2013.01); *H04W 36/30* (2013.01); *H04W 72/085* (2013.01); *H04W 76/027* (2013.01); *H04W 88/06* (2013.01)

(58) Field of Classification Search
CPC . H04W 72/085; H04B 7/0608; H04B 7/0814; H04B 7/0404; H04B 1/44; H04B 7/0602; H04B 7/0604; H01Q 3/24
USPC .......................................................... 370/329
See application file for complete search history.

(56) References Cited

U.S. PATENT DOCUMENTS

| | | | |
|---|---|---|---|
| 5,541,963 | A | 7/1996 | Nakagoshi |
| 5,940,454 | A | 8/1999 | McNicol et al. |
| 6,029,057 | A | 2/2000 | Paatelma et al. |
| 6,032,033 | A | 2/2000 | Morris et al. |
| 6,035,183 | A | 3/2000 | Todd et al. |
| 6,360,088 | B1 | 3/2002 | Shi et al. |
| 6,594,475 | B1 | 7/2003 | Anvekar et al. |
| 6,947,716 | B2 | 9/2005 | Ono |
| 6,961,545 | B2 | 11/2005 | Tehrani et al. |
| 7,295,528 | B2 | 11/2007 | Ibrahim et al. |
| 7,447,171 | B2 | 11/2008 | Smallcomb et al. |
| 7,471,702 | B2 | 12/2008 | Laroia et al. |
| 7,492,842 | B2 | 2/2009 | Yen et al. |
| 7,499,691 | B1 | 3/2009 | Dunn et al. |
| 7,502,592 | B2 | 3/2009 | Yamamoto et al. |
| 7,546,404 | B2 | 6/2009 | Yeh et al. |
| 7,907,573 | B2 | 3/2011 | Lee et al. |
| 7,991,429 | B2 | 8/2011 | Chiu |
| 8,009,096 | B2 | 8/2011 | Harel et al. |
| 8,014,817 | B2 | 9/2011 | Suzuki et al. |
| 8,036,710 | B2 | 10/2011 | Walton et al. |
| 8,085,734 | B2 | 12/2011 | Faber |
| 8,144,821 | B2 | 3/2012 | Hutchison et al. |
| 8,159,399 | B2 | 4/2012 | Dorsey et al. |
| 8,213,344 | B2 | 7/2012 | Zhu et al. |
| 8,244,944 | B1 | 8/2012 | Wong et al. |
| 8,301,192 | B2 | 10/2012 | Kakitsu et al. |
| 8,340,714 | B2 | 12/2012 | Hassan et al. |
| 8,417,205 | B2 | 4/2013 | Tang et al. |
| 8,463,214 | B2 | 6/2013 | Yen et al. |
| 8,600,427 | B2 | 12/2013 | Ibrahim et al. |
| 8,615,270 | B2 | 12/2013 | Ibrahim et al. |
| 8,755,359 | B2 | 6/2014 | Faber |
| 8,831,532 | B2 | 9/2014 | Nukala et al. |
| 9,344,174 | B2 | 5/2016 | Ngai et al. |
| 2002/0086648 | A1 | 7/2002 | Wilhelmsson et al. |
| 2002/0118724 | A1 | 8/2002 | Kishimoto et al. |
| 2002/0126640 | A1 | 9/2002 | Komatsu |
| 2003/0157954 | A1 | 8/2003 | Medvedev et al. |
| 2004/0029619 | A1 | 2/2004 | Liang et al. |
| 2004/0229650 | A1 | 11/2004 | Fitton et al. |
| 2004/0242277 | A1 | 12/2004 | Kiribayashi |
| 2005/0059431 | A1 | 3/2005 | Matsui et al. |
| 2005/0101252 | A1 | 5/2005 | Carvalho et al. |
| 2005/0113038 | A1 | 5/2005 | Kasami et al. |
| 2005/0113039 | A1 | 5/2005 | Tsukamoto |
| 2005/0266903 | A1 | 12/2005 | Masaki |
| 2006/0025090 | A1 | 2/2006 | Shirakata et al. |
| 2006/0073829 | A1 | 4/2006 | Cho et al. |
| 2006/0133544 | A1 | 6/2006 | Kawada et al. |
| 2006/0234776 | A1 | 10/2006 | Ishihara et al. |
| 2006/0252383 | A1 | 11/2006 | Forrester et al. |
| 2006/0276132 | A1 | 12/2006 | Sheng-Fuh et al. |
| 2007/0032255 | A1 | 2/2007 | Koo et al. |
| 2007/0066244 | A1 | 3/2007 | Kao et al. |
| 2007/0066361 | A1 | 3/2007 | Knudsen et al. |
| 2007/0093282 | A1 | 4/2007 | Chang et al. |
| 2007/0178839 | A1 | 8/2007 | Rezvani et al. |
| 2007/0238496 | A1 | 10/2007 | Chung et al. |
| 2007/0285326 | A1* | 12/2007 | McKinzie ............ H01Q 9/0407 343/746 |
| 2008/0043671 | A1 | 2/2008 | Moon et al. |
| 2008/0102760 | A1 | 5/2008 | McConnell et al. |
| 2008/0123610 | A1 | 5/2008 | Desai et al. |
| 2008/0240280 | A1 | 10/2008 | Li |
| 2008/0311871 | A1 | 12/2008 | Qi et al. |
| 2008/0316913 | A1 | 12/2008 | Kim et al. |
| 2009/0124290 | A1 | 5/2009 | Tao et al. |
| 2009/0137206 | A1 | 5/2009 | Sherman et al. |
| 2009/0180451 | A1 | 7/2009 | Alpert et al. |
| 2009/0258622 | A1 | 10/2009 | Ruijter |
| 2009/0258627 | A1 | 10/2009 | Hanusch et al. |
| 2010/0022192 | A1 | 1/2010 | Knudsen et al. |
| 2010/0041355 | A1 | 2/2010 | Laroia et al. |
| 2010/0054210 | A1 | 3/2010 | Ostergren |
| 2010/0120466 | A1 | 5/2010 | Li |
| 2010/0172426 | A1 | 7/2010 | Chang |
| 2010/0184459 | A1 | 7/2010 | Mori |
| 2010/0215111 | A1 | 8/2010 | Filipovic et al. |
| 2010/0231473 | A1 | 9/2010 | Shtrom et al. |
| 2010/0232533 | A1* | 9/2010 | Lee ..................... H04B 7/0417 375/267 |
| 2010/0246725 | A1 | 9/2010 | Okuyama et al. |
| 2010/0296419 | A1 | 11/2010 | Kim et al. |
| 2011/0103442 | A1 | 5/2011 | Nakayauchi et al. |
| 2011/0164595 | A1 | 7/2011 | So et al. |
| 2011/0250926 | A1 | 10/2011 | Wietfeldt et al. |
| 2011/0292786 | A1 | 12/2011 | Haessler et al. |
| 2011/0311001 | A1 | 12/2011 | Lindenbauer et al. |
| 2012/0008510 | A1 | 1/2012 | Cai et al. |
| 2012/0027112 | A1 | 2/2012 | Jiang et al. |
| 2012/0115553 | A1 | 5/2012 | Mahe et al. |
| 2012/0142291 | A1 | 6/2012 | Rath et al. |
| 2012/0184327 | A1 | 7/2012 | Love et al. |
| 2012/0195224 | A1 | 8/2012 | Kazmi et al. |
| 2012/0202555 | A1 | 8/2012 | Bergman et al. |
| 2012/0207045 | A1 | 8/2012 | Pelletier et al. |
| 2012/0244895 | A1 | 9/2012 | Thomas et al. |
| 2012/0281553 | A1 | 11/2012 | Mujtaba et al. |
| 2012/0282982 | A1 | 11/2012 | Mujtaba et al. |
| 2012/0320803 | A1 | 12/2012 | Skarp |
| 2012/0328057 | A1 | 12/2012 | Kroeger et al. |
| 2013/0005278 | A1 | 1/2013 | Black et al. |
| 2013/0017797 | A1 | 1/2013 | Ramasamy et al. |

(56) References Cited

U.S. PATENT DOCUMENTS

| | | |
|---|---|---|
| 2013/0023265 A1 | 1/2013 | Swaminathan et al. |
| 2013/0033996 A1 | 2/2013 | Song et al. |
| 2013/0035051 A1 | 2/2013 | Mujtaba et al. |
| 2013/0040671 A1 | 2/2013 | Zawaideh et al. |
| 2013/0084807 A1* | 4/2013 | Nukala et al. .................. 455/62 |
| 2013/0156080 A1 | 6/2013 | Cheng et al. |
| 2013/0217450 A1 | 8/2013 | Kanj et al. |
| 2013/0267181 A1 | 10/2013 | Ayatollahi et al. |
| 2013/0307727 A1 | 11/2013 | He et al. |
| 2013/0308476 A1 | 11/2013 | He et al. |
| 2013/0308477 A1 | 11/2013 | He et al. |
| 2013/0308478 A1 | 11/2013 | He et al. |
| 2013/0308554 A1 | 11/2013 | Ngai et al. |
| 2013/0308562 A1 | 11/2013 | Matin et al. |
| 2013/0308608 A1 | 11/2013 | Hu et al. |
| 2013/0309981 A1 | 11/2013 | Ngai et al. |
| 2013/0309982 A1 | 11/2013 | Yan et al. |
| 2013/0310045 A1 | 11/2013 | Yan et al. |
| 2013/0310109 A1 | 11/2013 | Filipovic et al. |
| 2014/0105204 A1 | 4/2014 | Bengtsson |

FOREIGN PATENT DOCUMENTS

| | | |
|---|---|---|
| CN | 100578962 C | 1/2010 |
| EP | 746118 A1 | 12/1996 |
| EP | 1175021 A2 | 1/2002 |
| EP | 1432067 A2 | 6/2004 |
| EP | 1482658 A2 | 12/2004 |
| EP | 1650885 A2 | 4/2006 |
| EP | 2139125 A1 | 12/2009 |
| EP | 2234276 A2 | 9/2010 |
| WO | WO-9819402 A1 | 5/1998 |
| WO | WO-0159945 A1 | 8/2001 |
| WO | WO-0241517 A2 | 5/2002 |
| WO | WO-02082688 A1 | 10/2002 |
| WO | WO-03007502 A1 | 1/2003 |
| WO | WO-2005039073 | 4/2005 |
| WO | 2007058494 A1 | 5/2007 |
| WO | WO-2009098614 A2 | 8/2009 |
| WO | 2010096710 A2 | 8/2010 |
| WO | 2011084715 A1 | 7/2011 |
| WO | WO-2011084717 A1 | 7/2011 |
| WO | 2012011077 A1 | 1/2012 |

OTHER PUBLICATIONS

International Search Report and Written Opinion—PCT/US2013/041895—ISA/EPO—Jul. 30, 2013.

Chapter II Demand & Response Under PCT Article 34—The International Preliminary Examining Authority; Feb. 28, 2014; (PCT/US2013/041883).

Chapter II Demand and Article 34 Amendments With Response to Written Opinion; International Searching Authority; Jan. 3, 2014; PCT/US2013/041895.

Notification of Transmittal of the International Preliminary Report on Patentability; International Preliminary Examining Authority; Oct. 6, 2014; PCT/US2013/041895.

* cited by examiner

SYSTEMS, APPARATUS, AND METHODS FOR ANTENNA SWITCHING APPROACH FOR INITIAL ACQUISITION PROCEDURE

PRIORITY CLAIMS & CROSS REFERENCE TO RELATED APPLICATIONS

The present application for patent claims priority to and the benefit of U.S. Provisional Application Nos.: (a) 61/649,704, filed 21 May 2012; (b) 61/716,582, filed 21 Oct. 2012; (c) 61/734,276, filed 6 Dec. 2012; (d) 61/737,715, filed 14 Dec. 2012; (e) 61/716,586, filed 21 Oct. 2012; (f) 61/716,599, filed 21 Oct. 2012; (g) 61/716,902, filed 22 Oct. 2012; and (h) 61/736,541, filed 12 Dec. 2012. All of said applications are assigned to the assignee hereof and are hereby expressly incorporated by reference herein as if fully set forth fully below in their entireties for all applicable purposes.

TECHNICAL FIELD

The technology discussed below relates generally to wireless communications, and more specifically to antenna selection for an initial acquisition procedure.

BACKGROUND

Wireless communication systems are widely deployed to provide various types of communication content such as voice and data. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

Mobile communications devices may perform an initial acquisition process to establish communications over a network in response to powering on, a handover to another radio access technology, a command from the network to switch frequencies, or the like. The mobile communications device may attempt to establish communications during the initial acquisition process over previous frequencies. It is desirable to successfully establish communications in different network conditions.

BRIEF SUMMARY OF SOME SAMPLE EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides an implementation of a method of establishing communications via a wireless network at a wireless communications apparatus. The method includes attempting an initial acquisition process, over one or more frequencies, for establishing communications over the wireless network via a transmit circuit and a receive circuit transmitting and receiving via a first antenna. The method further includes switching the transmit circuit and the receive circuit from transmitting and receiving via the first antenna to a second antenna in response to detecting failure of the initial acquisition process. The switching is independent of a performance metric of the first or the second antenna. The method further includes re-attempting the initial acquisition process based on the switching to the second antenna over the one or more frequencies.

Yet another aspect of the subject matter described in the disclosure provides a wireless communication apparatus operating within a wireless network. The wireless communications apparatus includes a transmit circuit configured to transmit communications via the wireless network. The wireless communications apparatus further includes a receive circuit configured to receive communications via the wireless network. The wireless communications apparatus further includes a first antenna and second antenna each operable to couple to the transmit circuit and the receive circuit. The wireless communications apparatus further includes a controller configured to attempt an initial acquisition process, over one or more frequencies, for establishing communications over the wireless network via the transmit circuit and the receive circuit configured to transmit and receive via the first antenna. The controller is further configured to switch the transmit circuit and the receive circuit from transmitting and receiving via the first antenna to the second antenna in response to detecting failure of the initial acquisition process. The switching is independent of a performance metric of the first or the second antenna. The controller is further configured to re-attempt the initial acquisition process based on the switching to the second antenna over the one or more frequencies.

Another aspect of the subject matter described in the disclosure provides a wireless communication apparatus operating within a wireless network. The apparatus includes a first means for transmitting or receiving signals. The apparatus further includes a second means for transmitting or receiving signals. The apparatus further includes means for attempting an initial acquisition process, over one or more frequencies, for establishing communications over the wireless network via the first means for transmitting or receiving signals. The apparatus further includes means for switching from the first means for transmitting or receiving signals to the second means for transmitting or receiving signals in response to detecting failure of the initial acquisition process. The switching is independent of a performance metric of the first or the second means for transmitting or receiving signals. The apparatus further includes means for re-attempting the initial acquisition process based on the switching to the second means for transmitting or receiving signals over the one or more frequencies.

Another aspect of the subject matter described in the disclosure provides a computer program product including a non-transitory computer readable medium encoded thereon with instructions that when executed cause a wireless communications apparatus to perform a method of establishing communications via a wireless network. The method includes attempting an initial acquisition process, over one or more frequencies, for establishing communications over the wireless network via a transmit circuit and a receive circuit transmitting and receiving via a first antenna. The method further includes switching the transmit circuit and the receive circuit from transmitting and receiving via the first antenna to a second antenna in response to detecting failure of the initial acquisition process. The switching is independent of a performance metric of the first or the second antenna. The method further includes re-attempting the initial acquisition process based on the switching to the second antenna over the one or more frequencies.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

Figure 1:
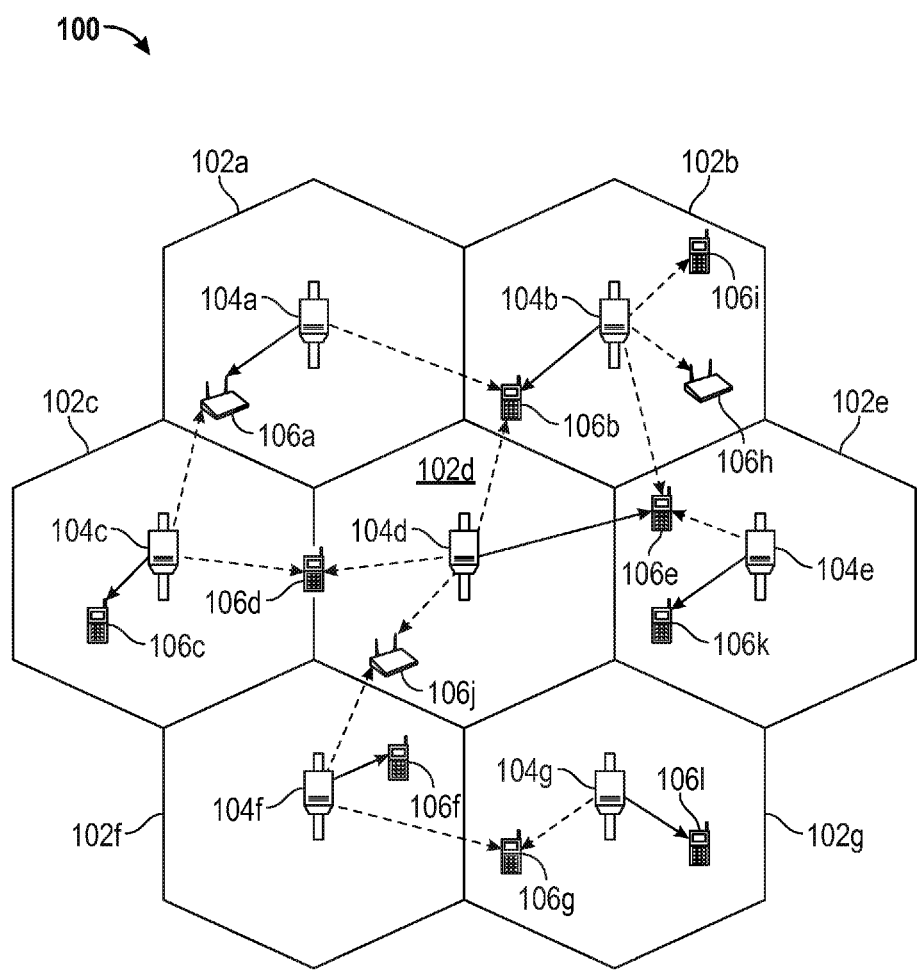
FIG. 1 shows an example of a simplified diagram of a wireless communication system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Like reference numerals may be used to denote like features throughout the specification and figures.

DETAILED DESCRIPTION

Various aspects of embodiments within the scope of the appended claims are described below. It should be apparent that the aspects described herein may be implemented in a wide variety of forms and that any specific structure and/or function described herein is merely illustrative. Based on the present disclosure a person/one having ordinary skill in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The word "exemplary" is used herein to mean "serving as an example, instance, or illustration." Any embodiment described herein as "exemplary" is not necessarily to be construed as preferred or advantageous over other embodiments. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM", etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 and EV-DO are described in documents from an organization named "3rd Generation Partnership Project 2" (3GPP2).

The techniques described herein may further be used with various modes associated with different radio access technologies such as simultaneous voice and data modes that allow simultaneously sending and receiving voice and non-voice data. For example, Simultaneous 1X Voice and EV-DO Data (SVDO) and Simultaneous 1X and LTE (SVLTE) modes may be employed in various embodiments.

Single carrier frequency division multiple access (SC-FDMA), which utilizes single carrier modulation and frequency domain equalization is one technique used in a wireless communication system. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

FIG. 1 illustrates an exemplary wireless communication network 100 in accordance with some embodiments. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104 (e.g., base stations), such as, for example, nodes 104a-104g. Each node 104 may provide communication coverage to a corresponding cell 102. The nodes 104 may interact with a plurality of access terminals (ATs), such as, for example, ATs 106a-106l. For ease of reference, ATs 106a-106l may be referred to hereinafter as an access terminal 106.

Each AT 106 may communicate with one or more nodes 104 on a forward link (FL) and/or a reverse link (RL) at a given moment. A FL is a communication link from a node to an AT. A RL is a communication link from an AT to a node. The FL may also be referred to as the downlink. Further, the RL may also be referred to as the uplink. The nodes 104 may be interconnected, for example, by appropriate wired or wireless interfaces and may be able to communicate with each other. Accordingly, each AT 106 may communicate with another AT 106 through one or more nodes 104.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide an access terminal (AT) 106 access within its coverage area to another communications network, such as, for example the internet or another cellular network.

An AT 106 may be a wireless communication device (e.g., a mobile phone, router, personal computer, server, etc.) used by a user to send and receive voice or data over a communications network. An access terminal (AT) 106 may also be referred to herein as a user equipment (UE), as a mobile station (MS), or as a terminal device. As shown, ATs 106a, 106h, and 106j comprise routers. ATs 106b-106g, 106i, 106k, and 106l comprise mobile phones. However, each of ATs 106a-106l may comprise any suitable communication device.

An access terminal 106 may be multimode, capable of operating using different radio access technologies (RATs) such as radio access technologies defined by standards such as cdma2000 1x, 1x-EV-DO, LTE, eHRPD, 802.11, and the like. An access terminal 106 may perform a plurality of tasks across various communication systems using different radio access technologies. The communication may be accomplished using a plurality of collocated transmitters or may be communicated using one single transmitter.

Figure 2:
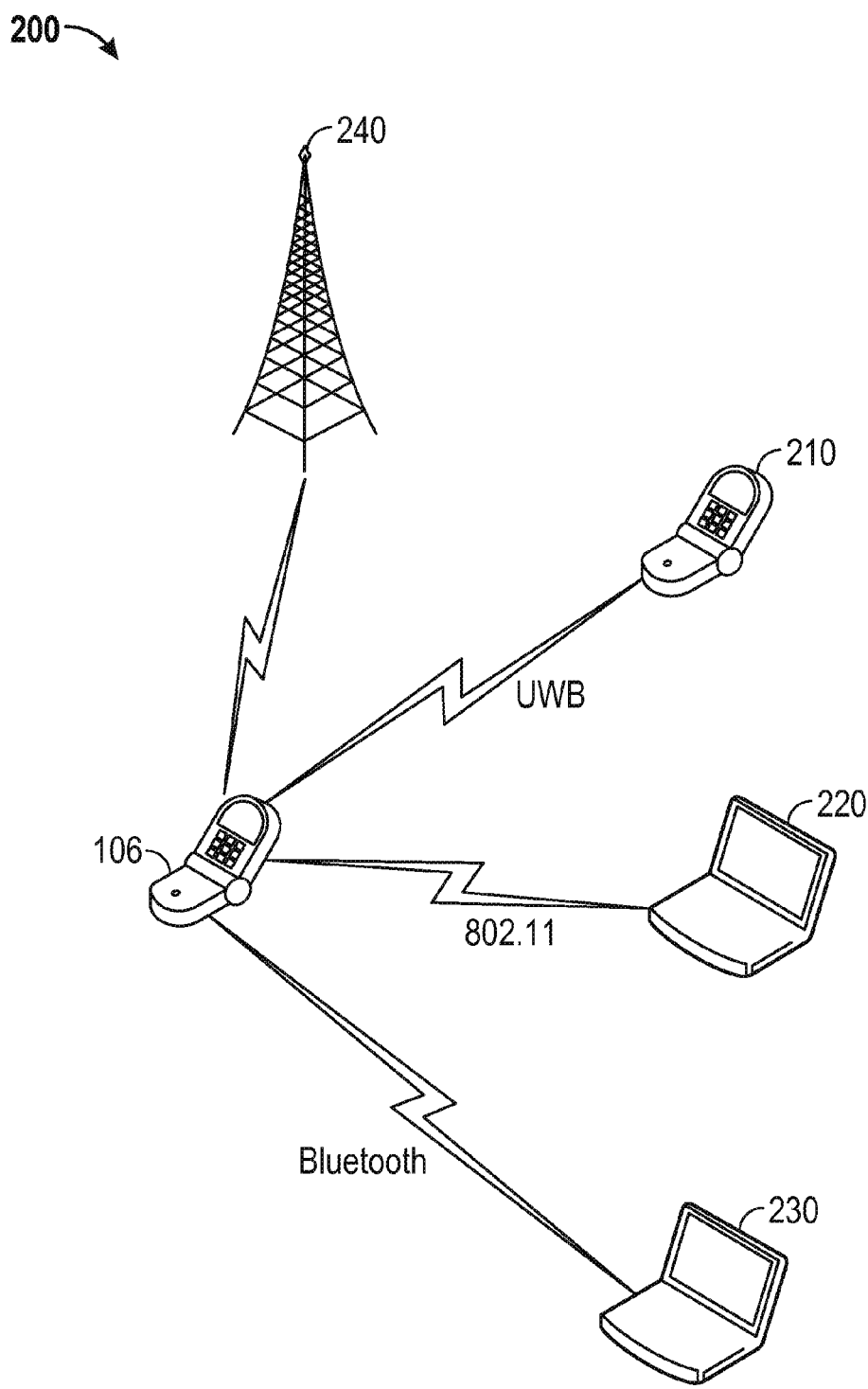
FIG. 2 shows an example of a functional block diagram of an exemplary mobile device operating in a wireless communication network in accordance with some embodiments.

FIG. 2 shows an example of a functional block diagram of an exemplary access terminal 106 operating in a wireless communication network 200 in accordance with some embodiments. The wireless communication network 200 comprises the access terminal 106, a second wireless communications device 210, a third wireless communications device 220, a fourth wireless communications device 230, and a cellular tower 240. The wireless communication network 200 may be configured to support communication between a multitude of devices, such as the wireless communications devices 106a, 210, 220, 230, and tower 240. The mobile wireless communications devices (e.g., 106a, 210, and 220) may comprise, for example, personal computers, PDAs, music players, video players, multimedia players, televisions, electronic game systems, digital cameras, video camcorders, watches, remote controls, headsets, and so on. Access terminal 106 may be simultaneously in communication with each of devices 210, 220, 230, and 240 via one or more transmitters collocated on access terminal 106.

With continuing reference to FIG. 2, the access terminal 106 may communicate with other wireless communications devices (e.g., 210, 220) over a variety of communication channels. The communication channels may comprise Ultra-Wide Band (UWB) channels, Bluetooth channels, 802.11 channels (e.g., 802.11a, 802.11b, 802.11g, and 802.11n), infrared (IR) channels, ZigBee (802.15) channels, or a variety of other channels, as is well known in the art. In one embodiment, the channel may be a UWB channel conforming to the ECMA-368 standard. Other channels would be readily recognized as possible as well.

The wireless communications network 200 may comprise a wireless local area network (WLAN) covering a physical area, like a home, office, or a group of buildings. A WLAN may use standards such as, 802.11 standard (e.g., 802.11g), and/or other standards for wireless communications. A WLAN may use peer-to-peer communication in which the wireless communication devices directly communicate with each other. The wireless communications network 200 may also comprise a wireless personal area network (WPAN), spanning, for example, an area of a few meters. A WPAN may use standards such as infrared, Bluetooth, a WiMedia based UWB standard (e.g., ECMA-368), and ZigBee standards, and/or other standards for wireless communications. A WPAN may use peer-to-peer communication in which the wireless communication devices directly communicate with each other. The wireless communications network 200 may also comprise a wide wireless area network (WWAN). The WWAN may use standards such as cdma2000 1X, 1X-EV-DO, LTE, eHRPD and the like. The access terminal 106 may connect to another network, such as a wireless communications network or the Internet, through network 200. The messages sent across the wireless communications network 200 may comprise information related to various types of communication (e.g., voice, data, multimedia services, etc.) and may be of varied degrees of importance to the user of access terminal 106, as described in greater detail below.

Although the following embodiments may refer to FIG. 1 or 2, one will recognize that they are readily applicable to other communication standards. For example, one embodiment may be applicable in a UMTS communication system. Some embodiments may be applicable in an OFDMA communication system. The communication system 200 may further comprise any type of communication system including, but not limited to, a code division multiple access (CDMA) system, a global system for mobile communication system (GSM), a wideband code division multiple access (WCDMA), and an OFDM system.

Figure 3:
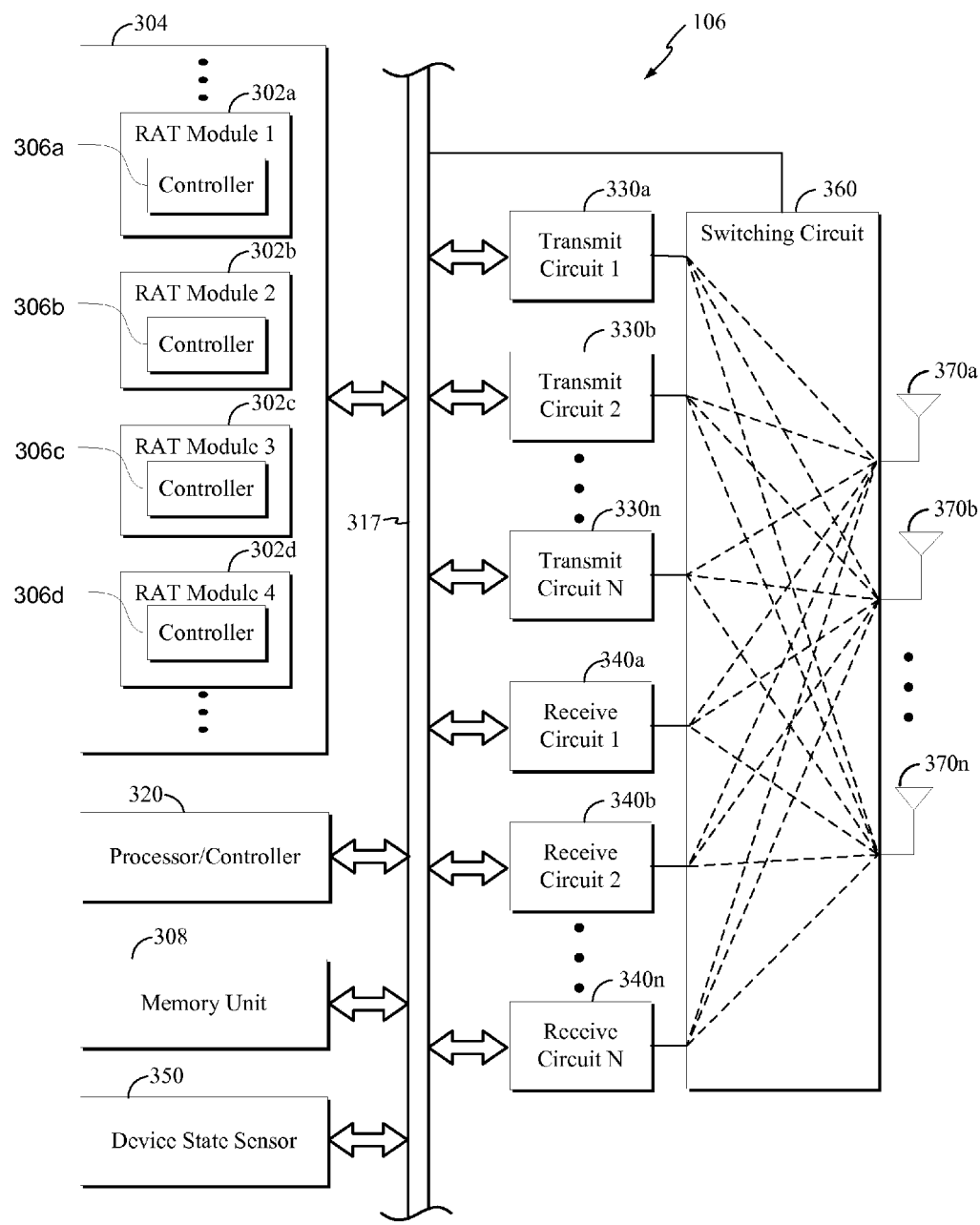
FIG. 3 shows an example of a functional block diagram of an exemplary access terminal shown in FIGS. 1 and 2 in accordance with some embodiments.

FIG. 3 shows an example of a functional block diagram of an exemplary access terminal 106 shown in FIGS. 1 and 2 in accordance with some embodiments. The access terminal 106 may be multimode, capable of operating using different radio access technologies (RATs) such as any of the radio technologies mentioned above with reference to FIGS. 1 and 2. The access terminal 106 is an example of a device that may be configured to implement the various methods described herein. The access terminal 106 may implement any of the devices illustrated in FIGS. 1-2.

The access terminal 106 may include a data bus 317 linking several circuits together. The circuits include a controller/processor 320, a memory unit 308, and RAT circuitry 304 which may include various radio access technology modules such as modules 302a, 302b, 302c, and 302d. The processor/controller 320 may comprise or be a component of a processing system implemented with one or more processors. The processor/controller 320 may be configured as or referred to as an application processor 320 in some embodiments. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

In addition, the processor/controller 320 may be configured to communicate with and control the operation of various modules configured for different radio access technologies (RATs). Each of modules 302a, 302b, 302c, and 302d may implement a specific radio access technology and may each individually include additional memory modules, communication components and functions which are applicable to the radio access technology type implemented by the module. Each module 302a, 302b, 302c, and 302d may further include a controller 306a, 306b, 306c, and 306d which may each also be referred to herein as a modem processor 306a, 306b, 306c, and 306d that may be used to control the operation of each RAT. For ease of reference, controllers 306a, 306b, 306c, and 306d may hereinafter be referred to as a RAT controller 306. Furthermore RAT controllers 306a, 306b, 306c, and 306d may be provided independently of each module 302a, 302b, 302c, and 302d for controlling the modules. In some embodiments, the processor 320 may be configured to perform the functions of the RAT controller 306. Furthermore, each RAT module 302a, 302b, 302c, and 302d may include its own transceiver(s) including antenna(s) (not shown). In addition, each of the RAT modules 302a, 302b, 302c and 302d may include other transmit and receive circuitry (not shown) specific the radio access technology implemented by each RAT module 302a, 302b, 302c and 302d. The RAT modules may implement any of the RAT types discussed above with reference to FIGS. 1-2 or other readily recognizable RAT types.

The access terminal 106 further comprises one or more transmit circuits 330a, 330b, and 330n. Transmit circuits 330a, 330b, and 330n may also be referred to as transmit chains having one or more components configured to transmit wireless communications via an antenna 370a. For example, transmit circuit 330a may include a modulator (not shown), a digital-to-analog (D/A) converter (not shown), an amplifier (not shown) as well as other circuitry for modulating and preparing a wireless communications signal for transmission via an antenna 370a. The RAT modules 302a, 302b, 302c, and 302d may share different components of a transmit circuit 330a. In some cases, the RAT circuitry 304 may include at least a portion of or all of transmit circuits 330a, 330b, and 330n where each RAT module 302a, 302b, 302c, and 302d may include one or more of transmit circuits 330a, 330b, and 330n. In some cases, transmit circuits 330a, 330b, and 330n may be configured to transmit according to a radio access technology associated with one of RAT modules 302a, 302b, 302c, and 302d. However, as indicated above, a transmit circuit 330a is shared by different RAT modules 302a, 302b, 302c, and 302d. In some cases, the access terminal 106 may have one transmit circuit 330a. In other cases, one or more of transmit circuits 330a, 330b, and 330n may be activated or deactivated. In one aspect, the transmit circuits 330a may include components particular to one of the RAT modules 302a, 302b, 302c, and 302d. For example, a RAT module 302a may implement a wireless communications using OFDM, while a second RAT module 302b may implement a wireless communications using CDMA. As such, one transmit circuit 330a may include components configured for OFDM communications while a second transmit circuit 330b may include components configured for CDMA communications.

The access terminal 106 further comprises one or more receive circuits 340a, 340b, and 340n. Receive circuits 340a, 340b, and 340n may also be referred to as receive chains having one or more components configured to receive wireless communications via an antenna 370a. For example, receive circuit 340a may include an amplifier (not shown), an analog-to-digital converter (not shown), a demodulator (not shown), as well as other circuitry for receiving and demodulating a wireless communications signal received via an antenna 370a. In some cases, the RAT circuitry 304 may include receive circuits 340a, 340b, and 340n where each RAT module 302a, 302b, 302c, and 302d may include one or more of receive circuits 340a, 340b, and 340n. The RAT modules 302a, 302b, 302c, and 302d may share different components of a receive circuit 340a. As such, each of receive circuits 340a, 340b, and 340n may be configured to receive according to a radio access technology associated with one of the RAT modules 302a, 302b, 302c, and 302d. However, as indicated above, a receive circuits 340a is shared by different RAT modules 302a, 302b, 302c, and 302d. In some cases, the access terminal 106 may have one receive circuit 340a. In other cases one or more of the receive circuits 340a, 340b, and 340n may be activated or deactivated.

Transmit circuits 330a, 330b, and 330n may process and convert base-band signals to high-frequency (HF) signals. Receive circuits 340a, 340b, and 340n in turn may process and buffer received signals before sending out to the data bus 317. Transmit circuits 330a, 330b, and 330n may process and buffer the data from the data bus 317 before sending out of the access terminal 106.

Each of transmit circuits 330a, 330b, and 330n and receive circuits 340a, 340b, and 340n (or similarly each RAT module 302a, 302b, 302c, and 302d) may be configured to respectively transmit and receive via one of several antennas 370a, 370b, and 370n. Individual transmit circuits 330a, 330b, and 330n and receive circuits 340a, 340b, and 340n may transmit and receive information associated with a different radio access technology via a particular antenna 370a, 370b, or 370n. For example, for simultaneous voice and data modes, one transmit circuit 330a may be used for transmitting voice data via antenna 370a while another transmit circuit 330b may be used for transmitting non-voice data via antenna 370b. Stated another way, a first transmit circuit 330a may be used for transmitting and receiving 1x voice data via antenna 370a while a second transmit circuit 330b may be used for data only (DO) LTE via antenna 370b. The processor/controller 320 directs the multiple transmit circuits 330a, 330b, and 330n and receive circuits 340a, 340b, and 340n for detecting and/or processing of signals from the different frequency bands via antennas 370a, 370b, and 370n. Antennas 370a, 370b, and 370n may be placed in different physical locations within the access terminal 106. For example, antennas 370a, 370b, and 370n may be at opposite (e.g., distal) ends or corners of the access terminal 106 or adjacent to each other. Generally, antennas 370a, 370b, and 370n can be located at similar or distinct places as desired or in accordance with device design.

A switching circuit 360 may be provided to allow a controller 320 to select antennas 370a, 370b, and 370n for which transmit circuits 330a, 330b, and 330n or receive circuits 340a, 340b, and 340n are configured to transmit and receive from. The switching circuit 360 may include circuitry configured to switch M inputs corresponding to transmit circuits 330a, 330b, and 330n and receive circuits 340a, 340b, and 340n to N outputs corresponding to antennas 370a, 370b, and 370n. As shown in FIG. 3, there may be more or less than three transmit circuits 330a, 330b, and 330n, three receive circuits 340a, 340b, and 340n, and three antennas 370a, 370b, and 370n. As one example, the switching circuit 360 may be configured as a crossbar switch or other suitable switching circuitry. The controller 320 may be configured to switch transmit circuits 330a, 330b, and 330n and receive circuits 340a, 340b, and 340n to respectively transmit and receive via any combination of antennas 370a, 370b, and 370n. As noted above, in some implementations, the transmit circuits 330a, 330b, and 330n, and receive circuits 340a, 340b, and 340n are included within RAT modules 302a, 302b, 302c, and 302d. As such, in some implementations, the switching circuit 360 is configured to switch each RAT module 302a, 302b, 302c, and 302d to respectively transmit and receive via any combination of antennas 370a, 370b, and 370n. In some implementations, a RAT module 302a may be determine an appropriate antenna and direct the switching via the switching circuit 360, in other implementations the controller 320 may direct switching, or any combination thereof.

In some embodiments, transmit circuits 330a, 330b, and 330n can be implemented as an external circuit pluggable to the access terminal 106.

The processor/controller 320 performs the function of data management of the data bus 317 and the function of general data processing, including executing the instructional contents of the memory unit 308. The memory unit 308 may include a set of modules and/or instructions. Instructions particular to the process steps of the access terminal 106 as shown and described in the embodiments described below can be coded in the various functions included in the contents of the memory unit 308. In one embodiment, the memory unit 308 is a RAM (Random Access Memory) circuit. Some communication device functions, such as the handoff functions, are software routines, modules, and/or data sets. The memory unit 308 can be tied to another memory circuit (not shown) which either can be of the volatile or nonvolatile type. As an alternative, the memory unit 308 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art. In addition, the memory unit 308 can be a combination of ASIC and memory circuitry of the volatile type and/or non-volatile type.

The access terminal 106 may further include a device state sensor 350. The device state sensor may be configured to detect one or more states or modes of a device according to how the device is being used, handled, and/or positioned. For example, the device state sensor 350 may be configured as a proximity sensor that may be configured to detect a proximity of the user or other object with respect to the access terminal 106. In one embodiment, the device state sensor 350 includes multiple proximity sensors. Each of the multiple proximity sensors are placed next to the antennas 370a, 370b, and 370n. Each of the multiple proximity sensors is configured to detect whether an object is in proximity (e.g., blocking) a respective antenna 370a, 370b, and 370n. The device state sensor 350 may further include and/or be configured as an orientation sensor such as an accelerometer that may be configured to detect the orientation of the access terminal 106 with respect to the user of the access terminal 106. The device state sensor 350 may further include and/or be configured as other types of sensors for detecting a temporary condition or state of the access terminal 106. While shown as one functional block, multiple device state sensors of different types may be included. Feedback from the device state sensor 350 may be indicative of a particular operating mode of the access terminal 106.

In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, modules, units, blocks, and the like, such as shown and described in FIG. 3.

Although described separately, it is to be appreciated that functional blocks described with respect to the access terminal 106 need not be separate structural elements. For example, the processor 320, the memory unit 308, and RAT modules 302a, 302b, 302c, and 302d may be embodied on a single chip. The processor 320 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

Figure 4A:
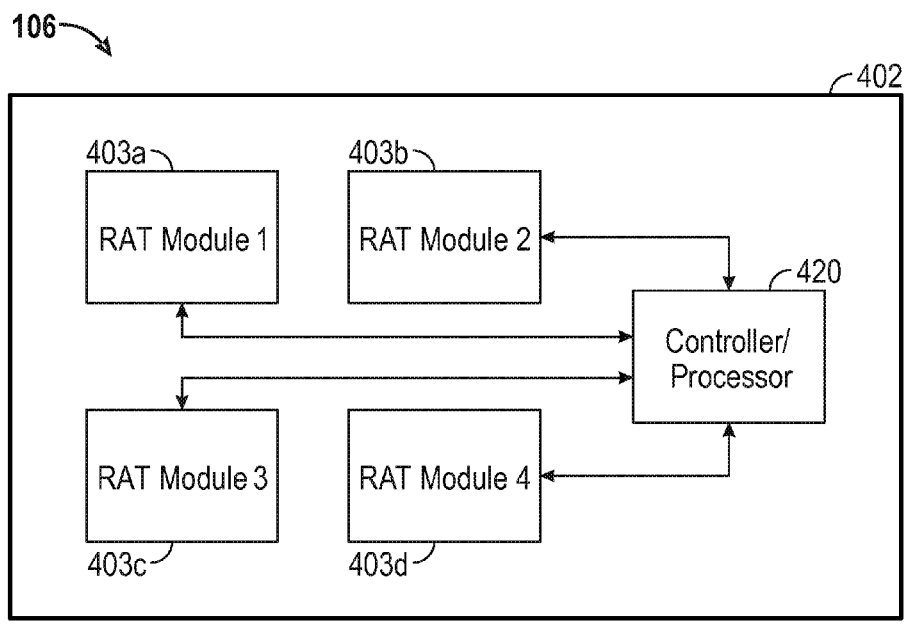
FIGS. 4A and 4B shows exemplary configurations for an access terminal having different radio access technology modules.
Figure 4B:
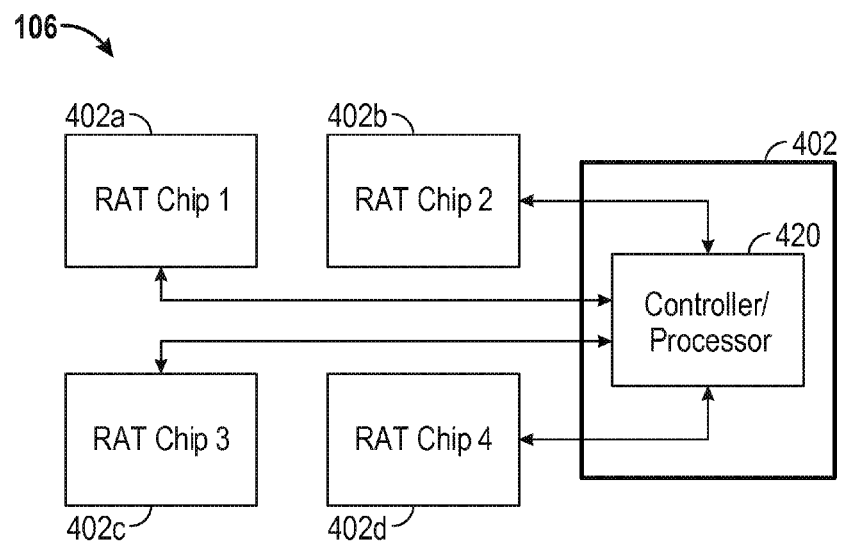

FIGS. 4A and 4B show two exemplary configurations for an access terminal 106 which implements multiple radio access technologies. FIG. 4A shows an exemplary configuration for access terminal 106 showing different radio access technologies implemented on a single chip 402. The chip 402 includes a controller/processor 420. The chip further includes radio access technology modules 403a, 403b, 403c and 403d. Each of the modules 403a, 403b, 403c and 403d may implement a different radio access technology, such as those discussed above with FIGS. 1-2.

FIG. 4B shows an exemplary configuration for access terminal 106 showing different radio access technologies implemented on separate chips. A chip 402 may include a controller/processor 420. Each radio access technology may be implemented on different chips 402a, 402b, 402c and 402d. The processor/controller 420 may control the operation of each of the chips 402a, 402b, 402c and 402d. Each chip 402a, 402b, 402c and 402d may further include individual processors/controllers (not shown), memory modules (not shown), as well as other components applicable to the radio access technology implemented.

Figure 5:
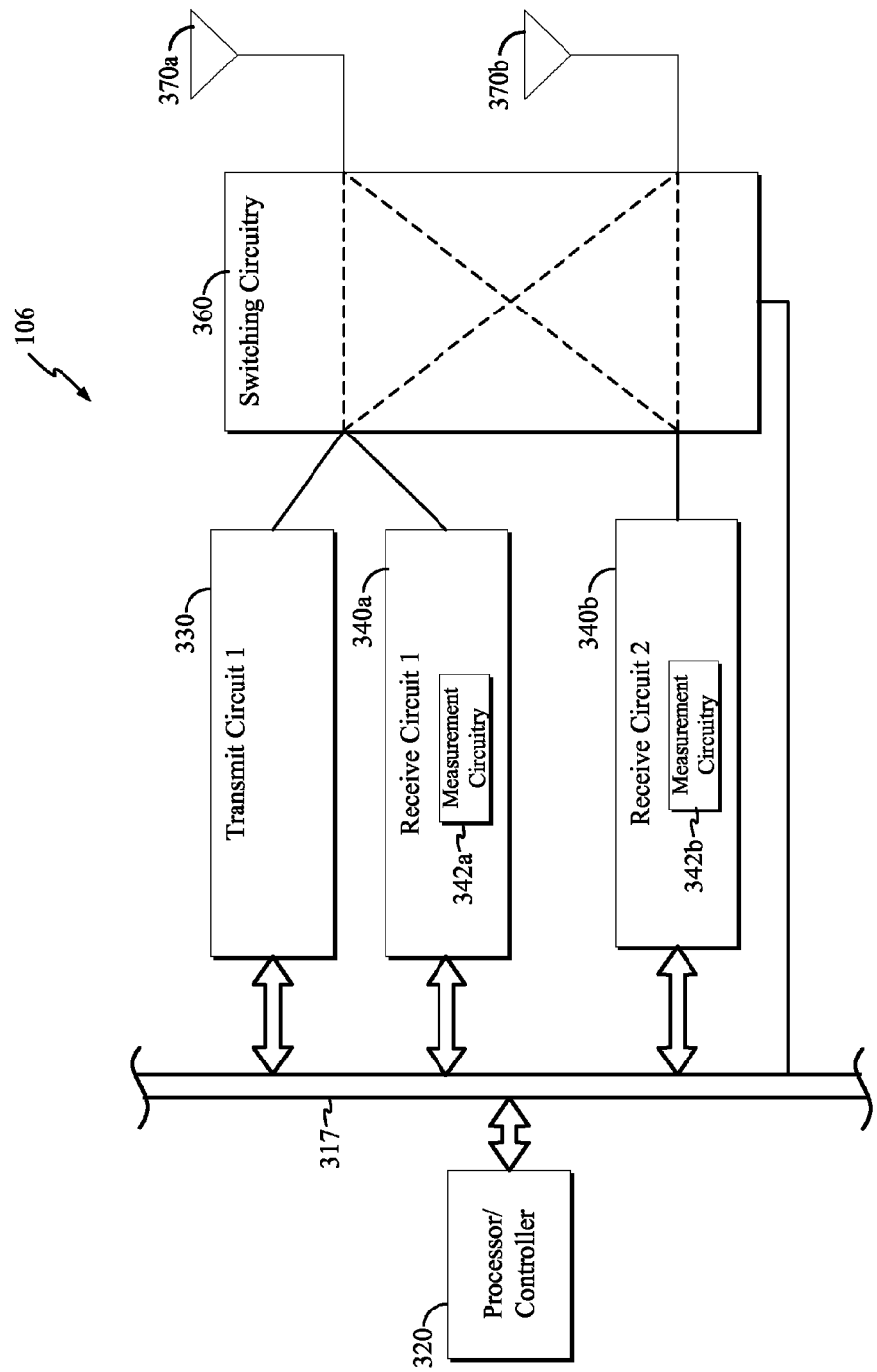
FIG. 5 is a functional block diagram of a portion of the access terminal shown in FIG. 3 in accordance with some embodiments.

FIG. 5 is a functional block diagram of a portion of the access terminal 106 shown in FIG. 3 in accordance with some embodiments. As shown in FIG. 5, the controller 320 may be configured to switch a transmit circuit 330 to communicate via either a first antenna 370a or a second antenna 370b. In addition, a receive circuit 340a may be associated with the transmit circuit 330 in that the receive circuit 340a is configured to communicate via the same antenna 370a or 370b used by the transmit circuit 330. The controller 320 may be configured to switch the transmit circuit 330 and receive circuit 340a to respectively transmit and receive via the first antenna 370a or the second antenna 370b. In addition, a second receive circuit 340b may be configured to communicate via either the antenna 370a or 370b that is not being used for the transmit circuit 330 and the first receive circuit 340a. The first receive circuit 340a and second receive circuit 340b may include measurement circuitry 342a and 342b configured to measure receive power levels. As one example, the measurement circuitry 342a and 342b may be configured to gather receive automatic gain control (AGC) measurements. The access terminal 106 may be configured in a mode such that both receive circuits 340a and 340b are configured to simultaneously receive via either the antenna 370a or 370b. In this case, both receive circuits 340a and 340b may be configured to demodulate the signal and obtain data based on the combination of demodulated data received by both circuits 340a and 340b. In addition, in one implementation, the first receive circuit 340a is configured to receive via one antenna 370a simultaneously while the second receive circuit 340b is configured to receive via the other antenna 370b. It is noted that a RAT module 302a may include the transmit circuit 330 of FIG. 5 and both receive circuits 340a and 340b in accordance with an embodiment.

As described above, multiple RAT modules 302a, 302b, 302c, and 302d may simultaneously transmit using multiple antennas 370a, 370b, and 370n. However, the performance of one antenna 370b may be better than another antenna 370b based on any one of a number of factors that may be related to, but not limited to, the arrangements of the antennas 370a, 370b, and 370c on the access terminal 106, the proximity of external objects to the antennas 370a, 370b, and 370c, inherent antenna characteristics, channel conditions, and the like. Furthermore, during operation, certain RAT modules 302a, 302b, 302c, and 302d may have different data transmission priorities or transmit power preferences. Certain aspects of various embodiments described herein are directed to switching between different antennas 370a, 370b, and 370n to improve performance of an access terminal 106. For example, it may be desirable for the transmit circuit 330a transmitting the highest priority data to transmit via the antenna 370a having the best performance. In addition, other transmit circuit power requirements may result in improved performance if a transmit circuit 330a is coupled to the highest performing antenna 370b. As operation of the access terminal 106 may affect antenna performance, it may be desirable to have dynamic systems and methods for coupling transmit circuits 330a, 330b, and 330c to antennas 370a, 370b, and 370n as provided by embodiments described herein.

With reference to FIGS. 3 and 4, certain operating conditions may result in one or more of antennas 370a, 370b, and 370n being de-sensed or otherwise resulting in a reduced performance. For example, the hand of a user may be wrapped around the access terminal 106 effectively blocking one or more of antennas 370a, 370b, and 370n. Or the access terminal 106 may be positioned such that antennas 370a, 370b, and 370n may operate with less than ideal receive and/or tranmsit conditions. These scenarios may reduce power levels of received signals thus making it more difficult to receive and demodulate signals. Blocking one or more of antennas 370a, 370b, and 370n may also reduce the total signal strength such that transmit circuits 330a, 330b, and 330n may need to increase power levels. However, with respect to increased transmit power levels, an access terminal 106 may be subject to regulatory radio frequency (RF) safety requirements. The access terminal 106 may be required to operate within specific guidelines before entering the market. For example, devices operating near the human body are evaluated to determine the Specific Absorption Rate ("SAR") their electromagnetic waves produce. SAR is the time-rate of electromagnetic energy absorption per unit of mass in a lossy media, and may be expressed as:

$$SAR(r) = \frac{\sigma(r)}{\rho(r)} |E(r)|_{rms}^2 \qquad \text{(Equation 1)}$$

Where E(r) is the exogenous electric field at point r, while σ(r) and ρ(r) are the corresponding equivalent electrical conductivity and mass density, respectively. In one aspect, these safety guidelines may limit the amount of transmit power levels.

Generally, SAR testing evaluates the amount of energy absorbed into the body from such devices with a single or multiple transmitters. Under one requirement, devices operating at distances beyond 20 cm may be evaluated through a maximum permissible exposure ("MPE") calculation or measurement. As such, when an one or more antennas 370a, 370b, and 370n are blocked by a human hand or other body part, the maximum transmit power level allowed to avoid exceeding SAR limits may be significantly reduced.

Other operating conditions depending on the position of the access terminal 106 with respect to a user or other objects may further reduce performance due to antenna blocking In addition, certain operating modes (e.g., using an access terminal 106 as a hotspot) may require increased power levels which may further impact regulatory limits.

To account for the various operating conditions in addition to other factors, certain aspects of certain embodiments described herein are directed to providing antenna selection diversity to maximize access terminal 106 performance. This may mitigate hand/body blocking and allow for selecting antennas in such a way to meet regulatory limits at the least cost to performance and/or to enable good receive and/or transmit conditions. Furthermore, in one aspect, antenna selection diversity may further be provided to mitigate interference issues.

In accordance with certain embodiments, the controller 320 may be configured to perform autonomous selection to dynamically determine mapping between transmit circuits 330*a*, 330*b*, and 330*n* and antennas 370*a*, 370*b*, and 370*n* as will be further described below.

In order to establish/re-establish communications over a wireless network, the access terminal 106 performs an initial acquisition (ACQ) procedure. The initial acquisition procedure may be performed, for example, when the communication circuitry (e.g., transmit and receive circuits 330 and 340 or RAT modules 302) of the access terminal 106 is first powered on, the access terminal 106 switches between RAT modules 302*a* and 302*b* (i.e., is handed over from another radio access technology technology), or the access terminal 106 is directed to another frequency by the network. The initial acquisition procedure may include any one of a number of different operations used to establish persistent communications via the network. For example, the access terminal 106 begins listening for signals from the base station 104 at a particular frequency and performs processes for being able to successfully demodulate information included in a signal from a base station 104. This may include, for example, a pilot signal acquisition process including attempting to track a pilot signal, identifying multi-path components, performing synchronization, and the like. Demodulated data may then be used by the access terminal 106 to establish reliable communications with the base station and/or other devices.

The access terminal 106 may attempt the initial acquisition process based on a particular frequency. The frequency could correspond to an assigned frequency or the frequency used previously (e.g., last frequency used before powering down). In some cases the initial acquisition process may fail even if attempting the initial acquisition process with the correct frequency. The failure may be due to any one of a number of factors such to large path loss, interference, antenna blockage, fading effects, and the like. Particularly, as noted above, an antenna 370*a*, used by the access terminal 106 for the initial acquisition process may be blocked or otherwise suffer from poor performance, particularly as compared to other antennas 370*b* and 370*n* of the access terminal 106. Certain embodiments described herein are directed to leveraging the use of multiple antennas 370*a*, 370*b*, and 370*n* to improve the chances of a successful initial acquisition process.

Depending on the availability, either receive diversity (RxD) or antenna switching may be employed in response to a failed initial acquisition procedure. As noted above, receive diversity refers to simultaneously activating at least two receivers using different antennas 370*a* and 370*b* such that receive data may be combined to increase the chances that the signal may be successfully demodulated (e.g., at least one receiver receives a copy of the signal in a form that may be successfully demodulated or based on a combination of two received signals).

The initial acquisition process may be attempted via a previously used antenna 370*a* on a previous frequency (i.e., a frequency/antenna used for communication previously by the access terminal 106 over the network). By using the previously and successfully used antenna 370*a* and frequency, chances of a successful acquisition may be increased.

If the access terminal 106 detects the initial acquisition process failed via the first antenna 370*a*, then either a receive diversity mode may be activated or the access terminal 106 switches to a second antenna 370*b*. Whether receive-diversity is activated or whether the access terminal 106 performs an antenna switch may be based on several factors. In an embodiment, if receive diversity is available for the initial acquisition process, then the receive-diversity mode is used (e.g., in an access terminal 106, while receive diversity may be available for certain modes, it may not be available for the initial acquisition process). However, if receive diversity is not available for the initial acquisition process, then the access terminal 106 may switch to a second antenna. In another embodiment, the access terminal 106 may selectively determine whether to activate receive-diversity mode or whether to use a second antenna 370*b*. It is noted that the initial acquisition process may be repeated for all antennas 370*a*, 370*b*, and 370*n* of the access terminal 106.

It is further noted that the access terminal 106 may be configured to measure one or more performance characteristics associated with the first or second antenna 370*a* or 370*b*. The performance metrics (e.g., receive automatic gain control measurement or the like) may be obtained directly by measuring performance of the antenna 370*a*, or circuitry of each RAT module may be used to make measurements to determine or predict which antenna 370*a*, 370*b*, or 370*n* has better performance. Moreover, even where the previous antenna is used first, the access terminal 106 may determine which antenna 370*b* or 370*n* to used next based various performance characteristics that determines which other antenna 370*b* or 370*n* might have the best performance.

However, in some cases there may be no knowledge of the performance or blocked/unblocked status of each antenna 370*a*, 370*b*, and 370*n*. Furthermore, in some cases, due to performance measurement errors, an antenna 370*a* having better performance may be skipped according to a dynamic selection. Furthermore, in some cases, performance measurements may increase the complexity and/or the time needed to perform the initial acquisition process.

Accordingly, in accordance with certain embodiments, the initial acquisition process may rely on "blindly" switching between antennas 370*a*, 370*b*, and 370*n* according to a predetermined order in response to detecting a failed acquisition. In accordance with these embodiments, the switching is performed independent of any performance metric of the antennas 370*a*, 370*b*, and 370*n*.

Figure 6:
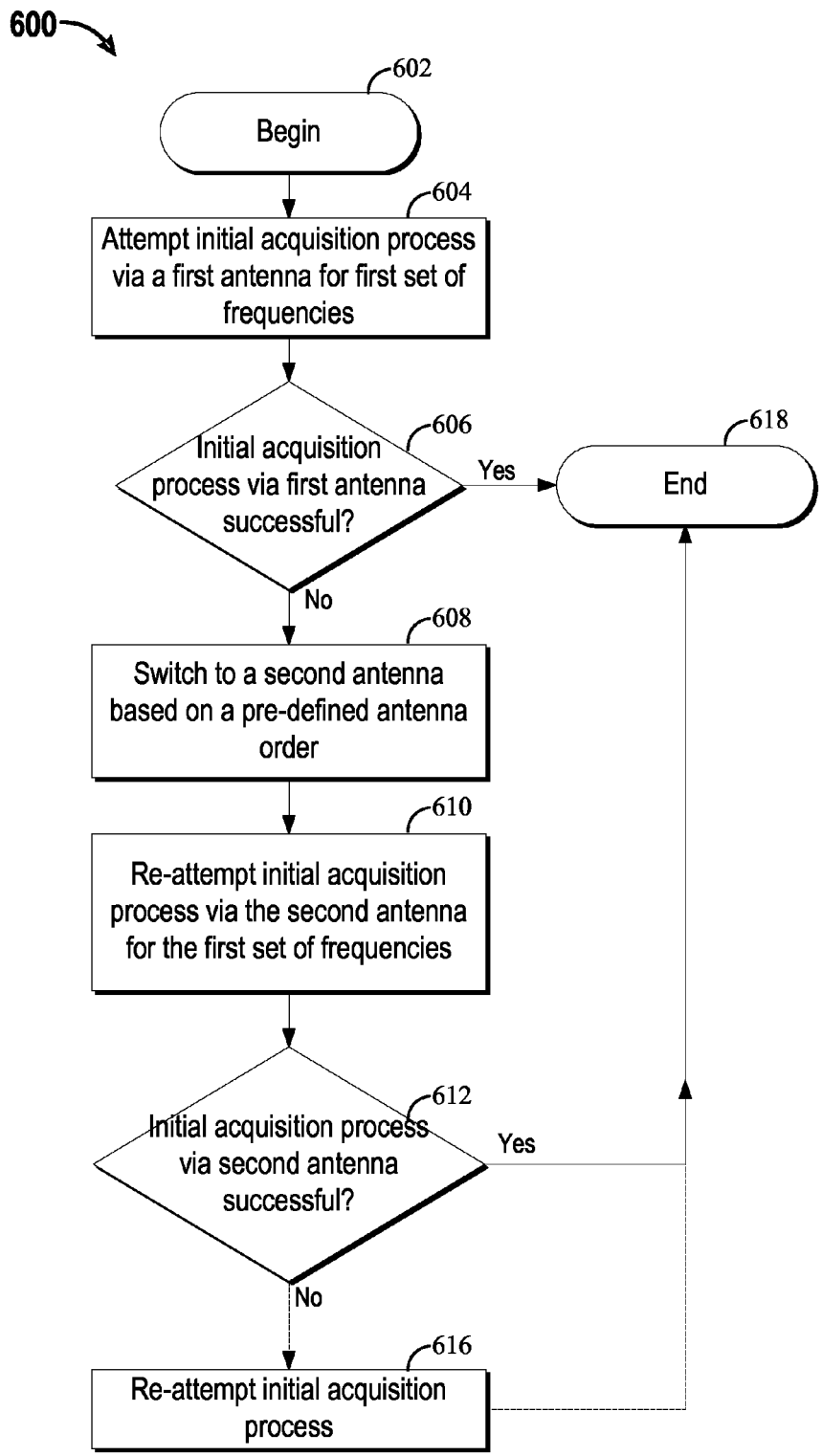
FIG. 6 is a flowchart of an exemplary method for performing an initial acquisition process for establishing communications over a network, in accordance with an embodiment.

FIG. 6 is a flowchart of an exemplary method 600 for performing an initial acquisition process for establishing communications over a network, in accordance with an embodiment. At block 602, the method begins when a condition triggers performance of an initial acquisition process (i.e., as described above in response to a handover or powering on of the access terminal 106). At block 604, the access terminal 106 attempts an initial acquisition process via a first antenna 370*a* for a set of frequencies. In this case, the access terminal 106 performs the initial acquisition process for each frequency via the first antenna 370*a* until success or failure at all frequencies. The first antenna 370*a* may correspond to the antenna 370*a* previously used as described above. In this way, no dynamic antenna selection may be needed for the first attempt of the initial acquisition process. At block 606 it is determined whether the initial acquisition process was successful using the first set of frequencies via the first antenna 370*a*. If successful, the method ends at block 618.

If the initial acquisition process failed, then at block 608, the access terminal 106 switches to a second antenna 370*b* based on a pre-defined antenna order. For example, a controller 320 may use the switching circuit 360 to switch the transmit circuits and receive circuits 330 and 340 used for the initial acquisition process to communicate via the second antenna 370b. The switch to the second antenna 370b is independent from any performance metrics or other measurements of the antennas 370a, 370b, and 370n. For example, rather than being selected based on some dynamic selection, the second antenna 370b may be selected based on a pre-defined or substantially fixed order. At block 610, the initial acquisition process is re-attempted via the second antenna 370b for the first set of frequencies. At block 612 it is determined whether the initial acquisition process was successful using the second antenna 370b over the first set of frequencies. If acquisition is successful, then the method ends at block 618.

In some embodiments, if still unsuccessful, and receive diversity mode is available, then at block 614 receive-diversity mode is enabled and the initial acquisition is re-attempted at block 616. However, in some implementations, blocks 614 and 616 are not used.

As described above, the order in which the antennas 370a, 370b, and 370n are selected for attempting the initial acquisition process may be pre-defined based on a static order. In a further embodiment, the order in which the antennas 370a, 370b, and 370n are selected may be based on a random order. The random order is independent of a performance metric of the antennas 370a, 370b, and 370n. For example, at block 608, the second antenna 370b may be selected based on a random or pseudo-random selection of the remaining antennas 370b and 370n. A random number generator, or other pseudo-random operation may be used to select the next antenna 370b to use for performing the initial acquisition process.

In yet another embodiment, the access terminal 106 stores information regarding the outcome of the initial acquisition process via the different antennas 370a, 370b, and 370n in a memory 308. The order in which the antennas 370a, 370b, and 370n is selected is based on the stored historical information regarding past initial acquisition attempts. The information stored may be independent of any performance metric of the antennas 370a, 370b, and 370n. In accordance, at block 608, the second antenna 370b may be selected based on stored information based on previous initial acquisition attempts. In an embodiment, the first antenna used may correspond to the antenna 370a with the most past success, while subsequent antennas 370b and 370n are selected in order based on stored information regarding which antenna historically has had more success when performing the initial acquisition process.

It is noted that the method 600 may be extended to use other antennas. Each antenna 370a, 370b, and 370n of the access terminal 106 may be used for the initial acquisition process for the set of frequencies until successful. Furthermore, in an embodiment, the first set of frequencies may be a single frequency such the initial acquisition process cycles through each antenna 370a, 370b, and 370n for each frequency. In accordance with other embodiments, the set of frequencies comprises a plurality of frequencies and the initial acquisition process cycles through each antenna 370a, 370b, and 370b for each set of frequencies.

Figure 7:
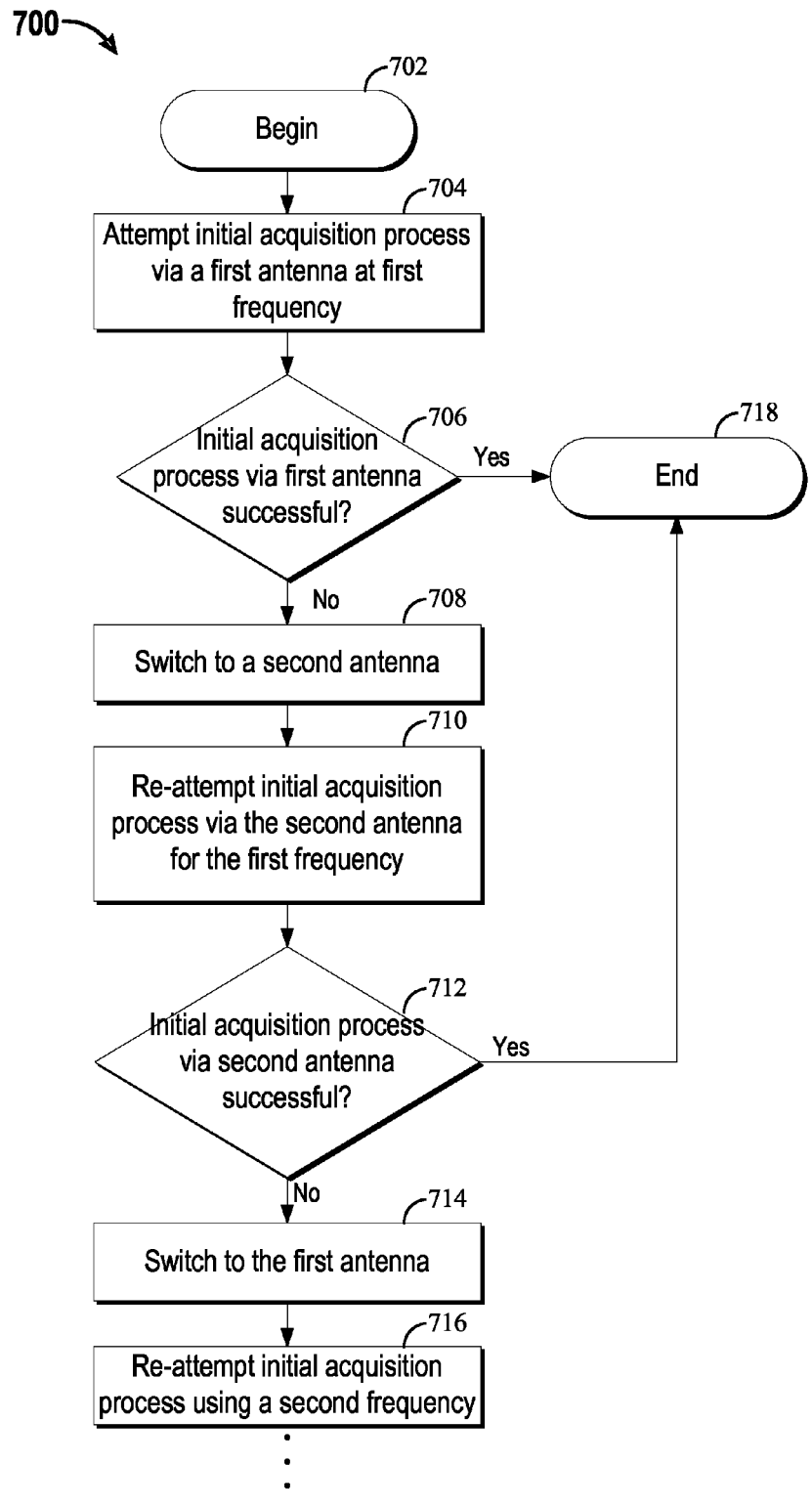
FIG. 7 is a flowchart of another exemplary method for performing an initial acquisition process for establishing communications over a network, in accordance with an embodiment.

FIG. 7 is a flowchart of another exemplary method 700 for performing an initial acquisition process for establishing communications over a network, in accordance with an embodiment. At block 702, the method begins when a condition triggers performance of an initial acquisition process (i.e., as described above in response to a handover or powering on of the access terminal 106). At block 704, the access terminal 106 attempts an initial acquisition process via a first antenna 370a for a first frequency. The first antenna 370a may correspond to the antenna previously used as described above. However, in other cases the first antenna 370a is selected based on an assigned order. At block 706 it is determined whether the initial acquisition process was successful using the first frequency via the first antenna 370a. If successful, the method ends at block 718.

If the initial acquisition process failed, then at block 708, the access terminal 106 switches to a second antenna 370b. As described above, for example, a controller 320 may use the switching circuit 360 to switch the transmit circuits and receive circuits 330 and 340 used for the initial acquisition process to communicate via the second antenna 370b. The switch to the second antenna 370b is independent from any performance metrics or other measurements of the antenna. At block 710, the initial acquisition process is re-attempted via the second antenna 370b for the first frequency. At block 712 it is determined whether the initial acquisition process was successful using the second antenna 370b over the first frequency. If acquisition is successful, then the method ends at block 718. Otherwise, the method continues at block 714 where the access terminal 106 switches back to the first antenna 370a. The initial acquisition process is then re-attempted at block 716 for a second frequency via the first antenna 370a. The method 700 may then continue where the access terminal 106 cycles through each antenna 370a, 370b, and 370n for each frequency. As noted above, the method 700 may be adapted for more than two antennas where each available antenna 370a, 370b, and 370n is used for each frequency.

In accordance with the embodiments described above with reference to FIGS. 6 and 7, the performance of each antenna 370a, 370b, and 370n is not measured and switching is done independently of any performance metric. As noted above, this may reduce complexity and may increase the speed of the process for re-attempting the initial acquisition process via multiple antennas. In addition, attempting the initial acquisition process for each available antenna 370a, 370b, and 370n may be guaranteed without skipping any antenna, in contrast to being based on performance metrics with errors that may erroneously skip or limit use to certain antennas 370a, 370b, 370n. In one aspect, therefore, these embodiments may increase robustness of the process for re-attempting the initial acquisition process via multiple antennas. It is noted that the principles described herein are applicable to different radio access technologies such as WCDMA, 1X/EvDo, GSM, LTE, and the like.

Figure 8:
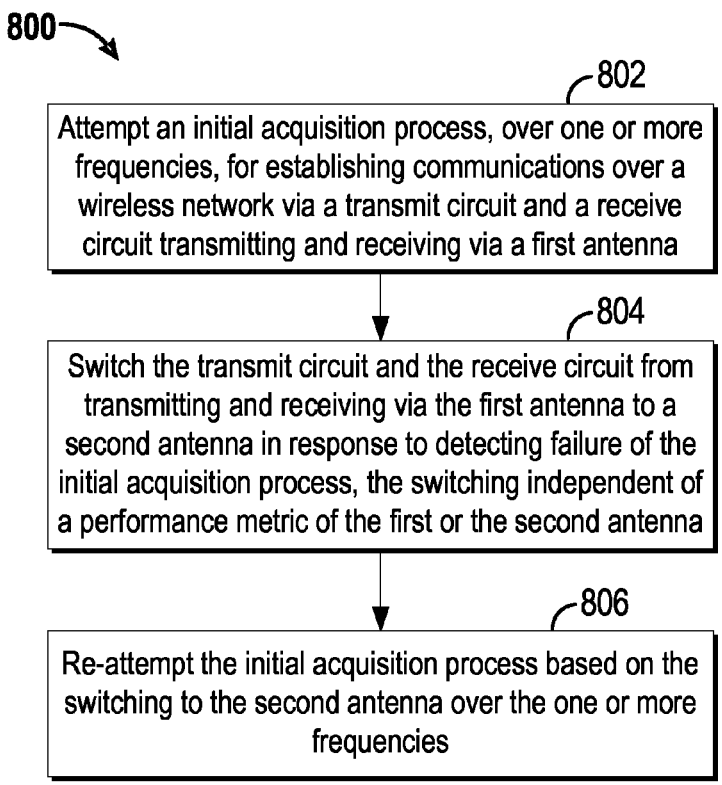
FIG. 8 is a flowchart of another exemplary method for performing an initial acquisition process for establishing communications over a network, in accordance with an embodiment.

FIG. 8 is a flowchart of another exemplary method 800 for performing an initial acquisition process for establishing communications over a network, in accordance with an embodiment. The method 800 may be implemented at a wireless communication apparatus implemented as an access terminal 106, for example. Although the method 800 is described below with respect to elements of the access terminal 106, those having ordinary skill in the art will appreciate that other components may be used to implement one or more of the blocks described herein.

At block 802, an initial acquisition process is attempted over one of more frequencies for establishing communications over a wireless network via a transmit circuit 330a and a receive circuit 340a transmitting and receiving via a first antenna 370a. The transmit circuit 330a and the receive circuit 340a may be used in combination with any of the RAT modules 302 to acquire signals to establish communications for any of the RATs. At block 804, the transmit circuit 330a and the receive circuit 340a are switched from transmitting and receiving via the first antenna 370a to a second antenna 370b in response to detecting failure of the initial acquisition process. The switching is independent of a performance metric of the first or the second antenna 370a and 370b. At block 806, the initial acquisition process is re-attempted based on the switching to the second antenna 370b over the one or more frequencies.

Figure 9:
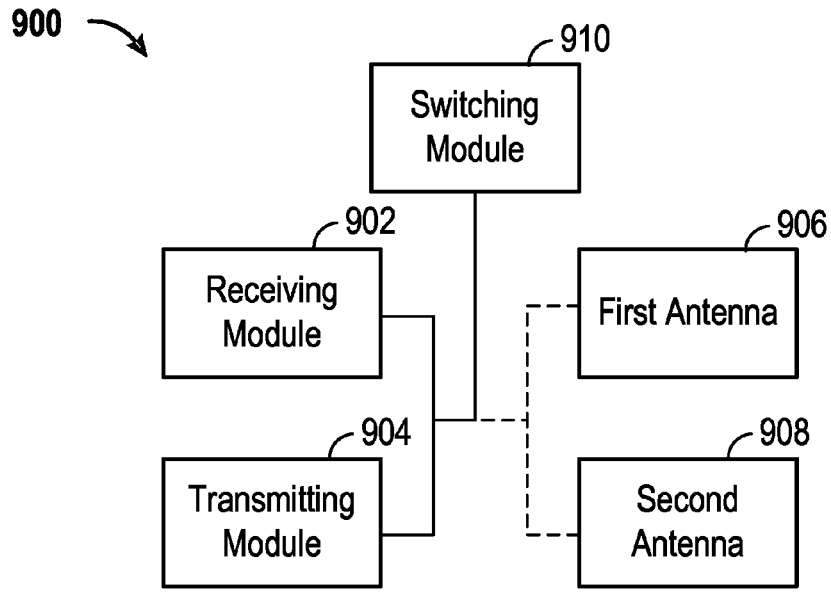
FIG. 9 is a functional block diagram of another exemplary wireless communication apparatus that may be employed within the wireless communication system in accordance with some embodiments.

FIG. 9 is a functional block diagram of another exemplary wireless communication apparatus 900 that may be employed within the wireless communication system 100 in accordance with some embodiments. Those skilled in the art will appreciate that a wireless communication device 900 may have more components, such as any one or more of the components shown in FIG. 3. The wireless communication device 900 shown includes only those components useful for describing some prominent features of certain embodiments. The device 900 includes a receiving module 902 and a transmitting module 904. In some cases, a means for receiving may include the receiving module 902. In some cases, a means for transmitting may include a transmitting module 904. The receiving module 902 and the transmitting module 904 may be configured to perform one or more of the functions described in blocks 802 and 806 of FIG. 8. The receiving module 902 and the transmitting module 904 may include the controller 320 (FIG. 3). The device 900 further includes a first antenna 906 and second antenna 908. The first antenna 906 may include a first means for transmitting or receiving signal. The second antenna 908 may include a second means for transmitting or receiving signals. The device 900 further includes a switching module 910. The switching module 910 may be configured to perform one or more of the functions described above with respect to block 804 of FIG. 8. In some cases, a means for switching may include the switching module 910. The switching module may include the controller 320 and may include switching circuitry 360.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Figure 10:
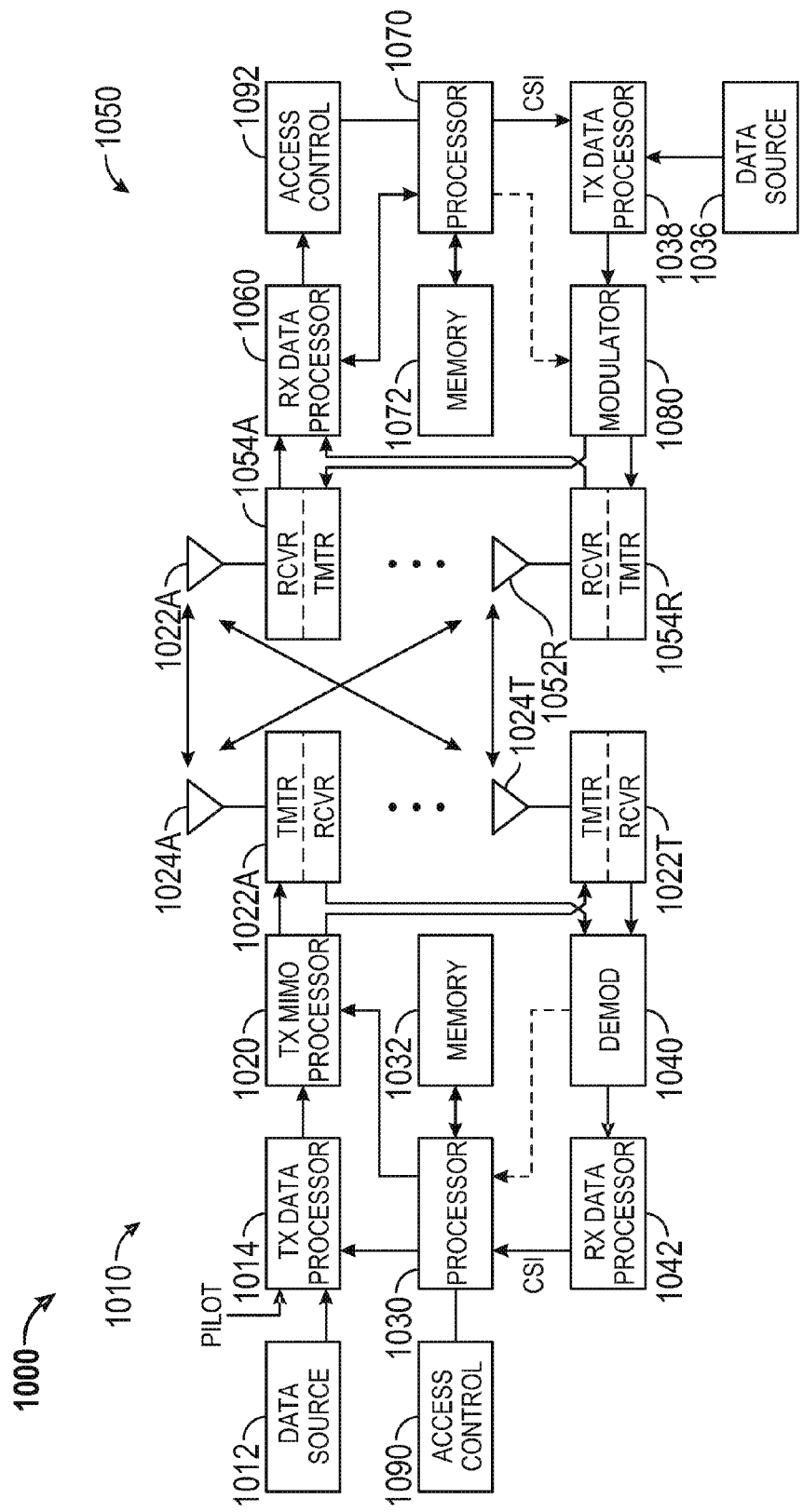
FIG. 10 shows an example of a functional block diagram of various components in a communication system in accordance with some embodiments.

Furthermore, as indicated by the systems and methods described above, the teachings herein may be incorporated into a node (e.g., a device) employing various components for communicating with at least one other node. FIG. 10 depicts several sample components that may be employed to facilitate communication between nodes in accordance with some embodiments. Specifically, FIG. 10 is a simplified block diagram of a first wireless device 1010 (e.g., an access point) and a second wireless device 1050 (e.g., an access terminal) of a multiple-in-multiple-out (MIMO) system 1000. At the first device 1010, traffic data for a number of data streams is provided from a data source 1012 to a transmit (TX) data processor 1014.

In some aspects, each data stream is transmitted over a respective transmit antenna. The TX data processor 1014 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1030. A data memory 1032 may store program code, data, and other information used by the processor 1030 or other components of the device 1010.

The modulation symbols for all data streams are then provided to a TX MIMO processor 1020, which may further process the modulation symbols (e.g., for OFDM). The TX MIMO processor 1020 then provides $N_T$ modulation symbol streams to $N_T$ transceivers (XCVR) 1022A through 1022T. In some aspects, the TX MIMO processor 1020 applies beam-forming weights to the symbols of the data streams and to the antenna from which the symbol is being transmitted.

Each transceiver 1022 receives and processes a respective symbol stream to provide one or more analog signals, and further conditions (e.g., amplifies, filters, and up converts) the analog signals to provide a modulated signal suitable for transmission over the MIMO channel. $N_T$ modulated signals from transceivers 1022A through 1022T are then transmitted from $N_T$ antennas 1024A through 1024T, respectively.

At the second device 1050, the transmitted modulated signals are received by $N_R$ antennas 1052A through 1052R and the received signal from each antenna 1052 is provided to a respective transceiver (XCVR) 1054A through 1054R. Each transceiver 1054 conditions (e.g., filters, amplifies, and down converts) a respective received signal, digitizes the conditioned signal to provide samples, and further processes the samples to provide a corresponding "received" symbol stream.

A receive (RX) data processor 1060 then receives and processes the $N_R$ received symbol streams from $N_R$ transceivers 1054 based on a particular receiver processing technique to provide $N_T$ "detected" symbol streams. The RX data processor 1060 then demodulates, deinterleaves, and decodes each detected symbol stream to recover the traffic data for the data stream. The processing by the RX data processor 1060 is complementary to that performed by the TX MIMO processor 1020 and the TX data processor 1014 at the device 1010.

A processor 1070 periodically determines which precoding matrix to use (discussed below). The processor 1070 formulates a reverse link message comprising a matrix index portion and a rank value portion. A data memory 1072 may store program code, data, and other information used by the processor 1070 or other components of the second device 1050.

The reverse link message may comprise various types of information regarding the communication link and/or the received data stream. The reverse link message is then processed by a TX data processor 1038, which also receives traffic data for a number of data streams from a data source 1036, modulated by a modulator 1080, conditioned by the transceivers 1054A through 1054R, and transmitted back to the device 1010.

At the device 1010, the modulated signals from the second device 1050 are received by the antennas 1024, conditioned by the transceivers 1022, demodulated by a demodulator (DEMOD) 1040, and processed by a RX data processor 1042 to extract the reverse link message transmitted by the second device 1050. The processor 1030 then determines which pre-coding matrix to use for determining the beam-forming weights then processes the extracted message.

FIG. 10 also illustrates that the communication components may include one or more components that perform access control operations as taught herein. For example, an access control component 1090 may cooperate with the processor 1030 and/or other components of the device 1010 to send/receive signals to/from another device (e.g., device 1050) as taught herein. Similarly, an access control component 1092 may cooperate with the processor 1070 and/or other components of the device 1050 to send/receive signals to/from another device (e.g., device 1010). It should be appreciated that for each device 1010 and 1050 the functionality of two or more of the described components may be provided by a single component. For example, a single processing component may provide the functionality of the access control component 1090 and the processor 1030 and a single processing component may provide the functionality of the access control component 1092 and the processor 1070. Furthermore, the components of the apparatus 1000 described with reference to FIG. 3 may be incorporated with/into the components of FIG. 10.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-10 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the embodiments described in this disclosure may be readily apparent to those skilled in the art, and the generic principles defined herein may be applied to other embodiments without departing from the spirit or scope of this disclosure. Thus, the disclosure is not intended to be limited to the embodiments shown herein, but is to be accorded the widest scope consistent with the claims, the principles and the novel features disclosed herein. The word "exemplary" is used exclusively herein to mean "serving as an example, instance, or illustration." Any embodiment described herein as "exemplary" is not necessarily to be construed as preferred or advantageous over other embodiments.

Certain features that are described in this specification in the context of separate embodiments also can be implemented in combination in a single embodiment. Conversely, various features that are described in the context of a single embodiment also can be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

What is claimed is:

1. A method of establishing communications via a wireless network at a wireless communications apparatus, the method comprising:
    attempting an initial acquisition process, over one or more frequencies, for establishing communications over the wireless network via a transmit circuit and a receive circuit transmitting and receiving via a first antenna;
    switching the transmit circuit and the receive circuit from transmitting and receiving via the first antenna to a second antenna in response to detecting failure of the initial acquisition process, the switching independent of a performance metric of the first or the second antenna; and
    re-attempting the initial acquisition process based on the switching to the second antenna over the one or more frequencies,
    wherein the first and the second antenna are selected from a plurality of antennas based on an order selected based on stored data independent of the performance metric, and the stored data corresponds to data based on previous initial acquisition process attempts for the first and second antennas;
    wherein the stored data indicates that the first antenna has a highest past success in the previous initial acquisition process attempts and the second antenna has a next highest past success in the previous initial acquisition process attempts.

2. The method of claim 1, wherein an order for using the first and second antennas for attempting and re-attempting the initial acquisition process is based on an assigned order of the antennas, the order assigned prior to attempting the initial acquisition process.

3. The method of claim 1, wherein the initial acquisition process is performed in response to one of a switch between radio access technologies implemented by the wireless communications apparatus, powering on of the wireless communications apparatus, or a message received over the wireless network to change frequencies.

4. The method of claim 1, wherein the initial acquisition process comprises a process for successfully demodulating and synchronizing with a pilot signal.

5. The method of claim 1, wherein the one or more frequencies are a first set of frequencies, and wherein the method further includes switching the transmit circuit and the receive circuit from transmitting and receiving via the second antenna to the first antenna in response to detecting failure of the re-attempted initial acquisition process via the second antenna and re-attempts, again, using a second set of frequencies, different from the first set, the initial acquisition process.

6. The method of claim 1, wherein switching the transmit circuit and the receive circuit from transmitting and receiving via the first antenna to the second antenna in response to detecting failure of the initial acquisition process comprises switching in the absence of dynamically selecting the second antenna from one or more other antennas.

7. The method of claim 1, wherein the first or the second antenna is selected from a plurality of antennas based on a pre-defined antenna order.

8. The method of claim 1, further comprising:
    switching the transmit circuit and the receive circuit from transmitting and receiving via the second antenna to a third antenna in response to detecting failure of the re-attempt of the initial acquisition process via the second antenna; and
    again re-attempting the initial acquisition process based on the switching to the third antenna over the one or more frequencies.

9. A wireless communication apparatus operating within a wireless network, the wireless communications apparatus comprising:
    a transmit circuit configured to transmit communications via the wireless network;
    a receive circuit configured to receive communications via the wireless network;
    a first antenna and a second antenna each operable to couple to the transmit circuit and the receive circuit;
    a controller configured to:
        attempt an initial acquisition process, over one or more frequencies, for establishing communications over the wireless network via the transmit circuit and the receive circuit configured to transmit and receive via the first antenna;
        switch the transmit circuit and the receive circuit from transmitting and receiving via the first antenna to the second antenna in response to detecting failure of the initial acquisition process, the switching independent of a performance metric of the first or the second antenna; and
        re-attempt the initial acquisition process based on the switching to the second antenna over the one or more frequencies,
        wherein the first and the second antenna are selected from a plurality of antennas based on an order selected based on stored data independent of the performance metric, and the stored data corresponds to data based on previous initial acquisition process attempts for the first and second antennas;
        wherein the stored data indicates that the first antenna has a highest past success in the previous initial acquisition process attempts and the second antenna has a next highest past success in the previous initial acquisition process attempts.

10. The wireless communication apparatus of claim 9, wherein an order for using the first and second antennas for attempting and re-attempting the initial acquisition process is based on an assigned order of the antennas, the order assigned prior to attempting the initial acquisition process.

11. The wireless communication apparatus of claim 9, wherein the initial acquisition process is performed in response to one of a switch between radio access technologies implemented by the wireless communications apparatus, powering on of the wireless communications apparatus, or a message received over the wireless network to change frequencies.

12. The wireless communication apparatus of claim 9, wherein the initial acquisition process comprises a process for successfully demodulating and synchronizing with a pilot signal.

13. The wireless communication apparatus of claim 9, wherein the one or more frequencies are a first set of frequencies, and wherein the controller is further configured to switch the transmit circuit and the receive circuit from transmitting and receiving via the second antenna to the first antenna in response to detecting failure of the re-attempted initial acquisition process via the second antenna and configured to re-attempt, again, using a second set of frequencies, different from the first set, the initial acquisition process.

14. The wireless communication apparatus of claim 9, wherein the controller is configured to switch the transmit circuit and the receive circuit from transmitting and receiving via the first antenna to the second antenna in the absence of dynamically selecting the second antenna from one or more other antennas.

15. The wireless communication apparatus of claim 9, wherein the first or the second antenna is selected from a plurality of antennas based on a pre-defined antenna order.

16. The wireless communication apparatus of claim 9, further comprising a third antenna, wherein the controller is further configured to:
 switch the transmit circuit and the receive circuit from transmitting and receiving via the second antenna to a third antenna in response to detecting failure of the re-attempt of the initial acquisition process via the second antenna; and
 again re-attempt the initial acquisition process based on the switching to the third antenna over the one or more frequencies.

17. A wireless communication apparatus operating within a wireless network, the wireless communications apparatus comprising:
 a first means for transmitting or receiving signals;
 a second means for transmitting or receiving signals;
 means for attempting an initial acquisition process, over one or more frequencies, for establishing communications over the wireless network via the first means for transmitting or receiving signals;
 means for switching from the first means for transmitting or receiving signals to the second means for transmitting or receiving signals in response to detecting failure of the initial acquisition process, the switching independent of a performance metric of the first or the second means for transmitting or receiving signals; and
 means for re-attempting the initial acquisition process based on the switching to the second means for transmitting or receiving signals over the one or more frequencies,
 wherein the first and the second means for transmitting or receiving signals are selected from a plurality of means for transmitting or receiving signals based on an order selected based on stored data independent of the performance metric, and the stored data corresponds to data based on previous initial acquisition process attempts for the first and second means for transmitting or receiving signals;
 wherein the stored data indicates that the first antenna has a highest past success in the previous initial acquisition process attempts and the second antenna has a next highest past success in the previous initial acquisition process attempts.

18. The wireless communication apparatus of claim 17, wherein an order for using the first and second means for transmitting or receiving signals for attempting and re-attempting the initial acquisition process is based on an assigned order of the first and second means for transmitting or receiving signals, the order assigned prior to attempting the initial acquisition process.

19. The wireless communication apparatus of claim 17, wherein the initial acquisition process is performed in response to one of a switch between radio access technologies implemented by the wireless communications apparatus, powering on of the wireless communications apparatus, or a message received over the wireless network to change frequencies.

20. The wireless communication apparatus of claim 17, wherein the initial acquisition process comprises a process for successfully demodulating and synchronizing with a pilot signal.

21. The wireless communication apparatus of claim 17, wherein the one or more frequencies are a first set of frequencies, and wherein the apparatus further includes means for switching from the second means for transmitting or receiving signals to the first means for transmitting or receiving signals in response to detecting failure of the re-attempted initial acquisition process via the second means for transmitting or receiving signals and means for re-attempting, again, using a second set of frequencies, different from the first set, the initial acquisition process.

22. The wireless communication apparatus of claim 17, wherein the means for switching from the first means for transmitting or receiving signals to the second means for transmitting or receiving signals in response to detecting failure of the initial acquisition process comprises means for switching to the second means for transmitting or receiving signals in the absence of dynamically selecting the second means for transmitting or receiving signals from one or more other means for transmitting or receiving signals.

23. The wireless communication apparatus of claim 17, wherein the first or the second means for transmitting or receiving signals is selected from a plurality of means for transmitting or receiving signals based on a pre-defined order.

24. A computer program product comprising a non-transitory computer readable medium encoded thereon with instructions that when executed cause a wireless communications apparatus to perform a method of establishing communications via a wireless network, the method comprising:
 attempting an initial acquisition process, over one or more frequencies, for establishing communications over the wireless network via a transmit circuit and a receive circuit transmitting and receiving via a first antenna;
 switching the transmit circuit and the receive circuit from transmitting and receiving via the first antenna to a second antenna in response to detecting failure of the initial acquisition process, the switching independent of a performance metric of the first or the second antenna; and re-attempting the initial acquisition process based on the switching to the second antenna over the one or more frequencies, wherein the first and the second antenna are selected from a plurality of antennas based on an order selected based on stored data independent of the performance metric, and the stored data corresponds to data based on previous initial acquisition process attempts for the first and second antennas;

wherein the stored data indicates that the first antenna has a highest past success in the previous initial acquisition process attempts and the second antenna has a next highest past success in the previous initial acquisition process attempts.

25. The computer program product of claim 24, wherein an order for using the first and second antennas for attempting and re-attempting the initial acquisition process is based on an assigned order of the antennas, the order assigned prior to attempting the initial acquisition process.

26. The computer program product of claim 24, wherein the initial acquisition process is performed in response to one of a switch between radio access technologies implemented by the wireless communications apparatus, powering on of the wireless communications apparatus, or a message received over the wireless network to change frequencies.

27. The computer program product of claim 24, wherein the initial acquisition process comprises a process for successfully demodulating and synchronizing with a pilot signal.

28. The computer program product of claim 24, wherein the one or more frequencies are a first set of frequencies, and wherein the method further includes switching the transmit circuit and the receive circuit from transmitting and receiving via the second antenna to the first antenna in response to detecting failure of the re-attempted initial acquisition process via the second antenna and re-attempts, again, using a second set of frequencies, different from the first set, the initial acquisition process.

29. The computer program product of claim 24, wherein switching the transmit circuit and the receive circuit from transmitting and receiving via the first antenna to the second antenna in response to detecting failure of the initial acquisition process comprises switching in the absence of dynamically selecting the second antenna from one or more other antennas.

30. The computer program product of claim 24, wherein the first or the second antenna is selected from a plurality of antennas based on a pre-defined antenna order.

* * * * *